UNITED STATES PATENT OFFICE.

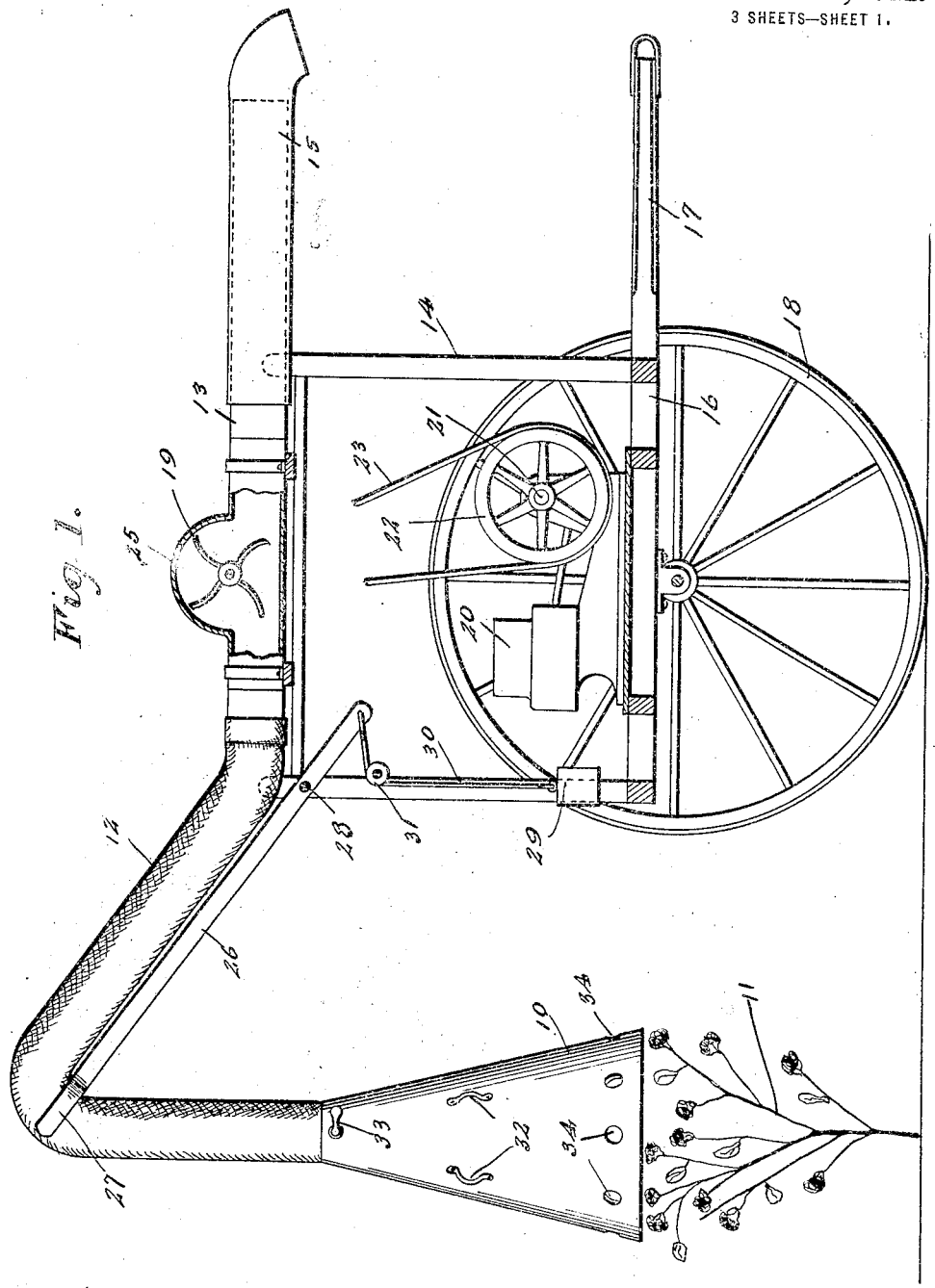

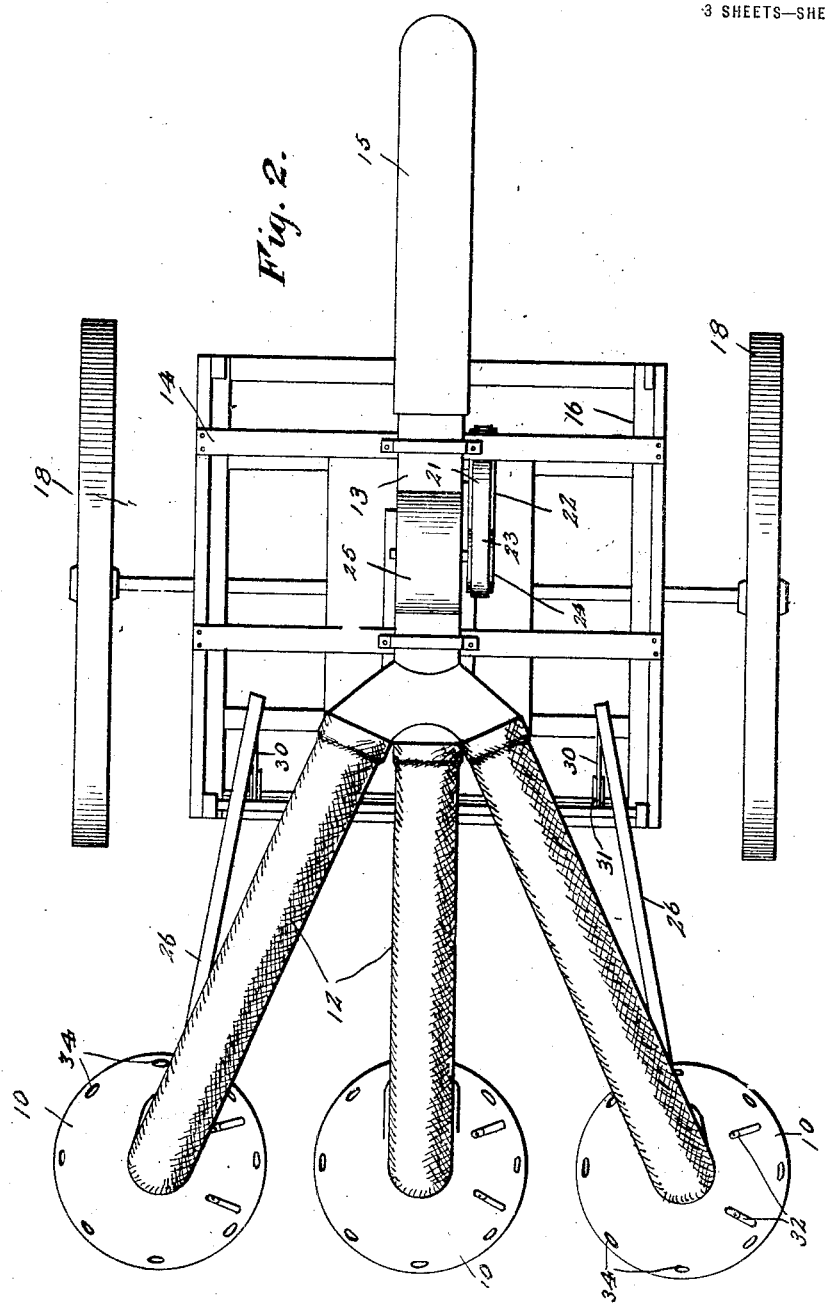

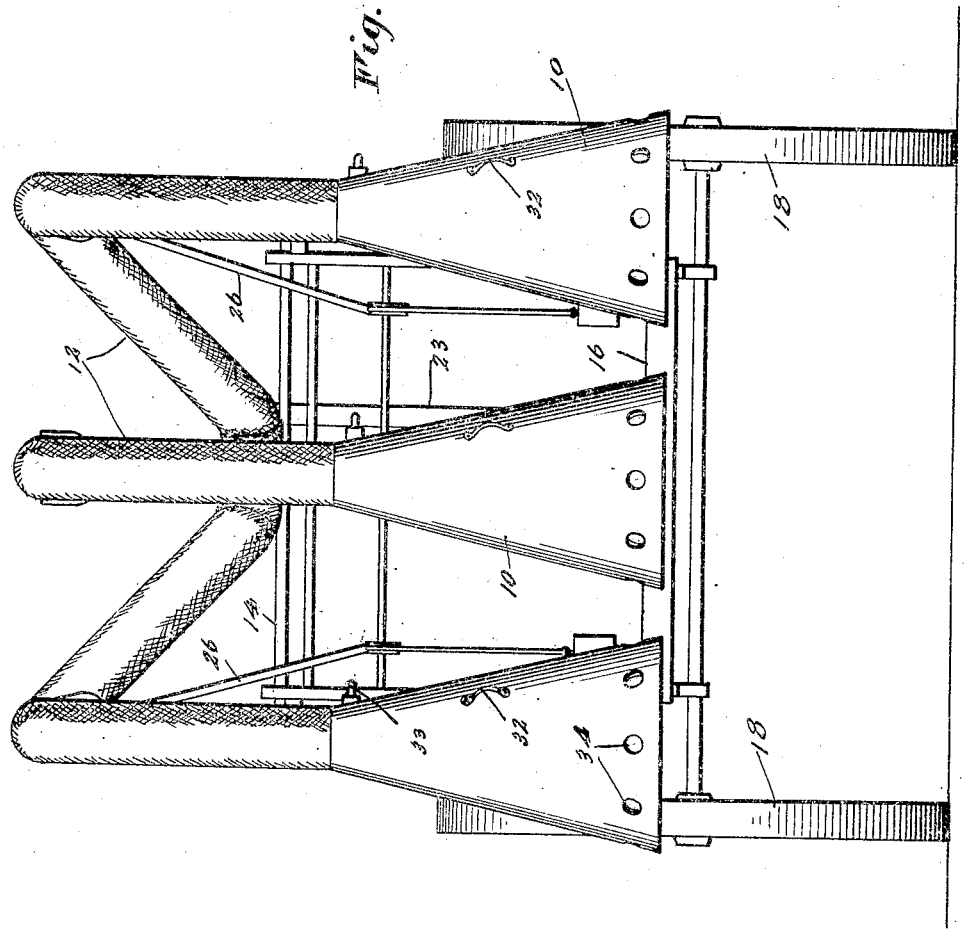

AUSTIN E. BURGES, OF JACKSONVILLE, TEXAS.

COTTON-PICKING MACHINE.

1,371,468.    Specification of Letters Patent.    Patented Mar. 15, 1921.

Application filed April 12, 1920. Serial No. 373,315.

*To all whom it may concern:*

Be it known that I, AUSTIN E. BURGES, a citizen of the United States, residing at Jacksonville, in the county of Cherokee and State of Texas, have invented new and useful Improvements in Cotton-Picking Machines, of which the following is a specification.

The object of the invention is to provide a relatively simple mechanism for effectively picking cotton and conveying it to an attendant vehicle or truck under such conditions as to result in harvesting a high grade of cotton free from dead leaves, twigs, unripened hulls and dirt and rubbish generally serving to contaminate and lower the grade of the products when harvested under the ordinary conditions except when the picking is done by hand and very carefully and laboriously at a considerable expense by reason of the cost of labor; it being the common experience that mechanical picking devices as ordinarily constructed, and particularly when employing suction as an agency in connection with nozzles which are arranged respectively close to the several cotton bolls, that such a large percentage of rubbish is accumulated as to very materially lower the grade and value of the material; and with these objects in view, and with the additional purpose of providing means by which the harvesting of cotton may be accomplished rapidly and economically and with a minimum of labor in the way of assistance, the invention consists in a construction and combination of parts of which a preferred embodiment is illustrated in the accompanying drawings, wherein:—

Figure 1 is a side view partly in section of the machine.

Fig. 2 is a plan view of the same.

Fig. 3 is a rear view.

The apparatus consists essentially of a suction nozzle 10 which may be of either cone or bell form, the former as illustrated being preferred and the nozzle being of a size adapted to present a suction zone of an area corresponding approximately with those of the cotton plant which is indicated in Fig. 1 at 11, so that the nozzle may be lowered to practically incase or house the plant containing the bolls, to the end that the loose cotton fibers may readily be taken up by the inwardly directed current of air, said nozzle being connected with a conveyer having a flexible section 12 of rubber, canvas or the equivalent thereof, a rigid section 13 supported by the frame work 14 of the truck, and an extensible section 15 consisting of telescopic members to permit of locating the discharge end thereof, in position to deposit the cotton in a vehicle or receptacle supported by a vehicle to which the truck supporting the apparatus may be attached as a trailer.

In the construction illustrated, the truck consists of the main frame 16 having the draft appliance 17 for attachment to the tractor or vehicle by which the apparatus is advanced through the field parallel with the rows of cotton plants, supporting or ground wheels 18 being mounted upon said main frame from which rise standards which support the stationary rigid section 13 of the conductor which is served by a suction fan 19 operated by a suitable motor indicated at 20 and which obviously may be of the explosion or any preferred type, the drive shaft 21 of said motor carrying a belt wheel 22 connected by a belt 23 with a pulley 24 on the spindle of the fan 19 which is arranged in a suitable housing 25. Preferably the wings of the fan are turned slightly backward as indicated in Fig. 1 to prevent the cotton in its passage through the conductor from being caught by the ends thereof and carried around through the housing and otherwise accumulating to afford an obstruction to the free passage through the conductor.

The flexible member or section 12 of the conductor is supported by an arm 26 provided at its outer end with a fork or yoke 27 which is engaged with the pipe or tube forming the conductor, said arm being pivoted as at 28 to the standard or upright of the frame and having connected with its opposite end, a counter-balance consisting in the construction illustrated of a weight 29 attached to a cable cord or chain 30 passing over a suitable direction pulley 31. The weight of the counter-balance is such as to support that of the flexible section of the conductor, and the nozzle so that the latter may be held in any position to which it may be adjusted or moved, as by means of the grips 32 with which the nozzle is provided for the convenience of the operators. In other words it is not intended that the nozzle and flexible section of the conductor be normally held in an elevated position, but that while the weight of these parts is carried so as to impose no burden in this respect upon the operators, the nozzle may be lowered and moved freely from side to side to cause it to occupy the desired and most effective position with relation to the cotton plant successively as they are encountered in the row, only a slight effort on the part of the operator being necessary to move these nozzles to the desired position.

In practice, it is preferable to drive the trucks in such a position as to straddle a row of cotton plants, and with each apparatus there is provided three nozzles and a corresponding number of flexible conductor sections, as indicated in Figs. 2 and 3, the several gathering elements consisting of the nozzle and flexible section of the conductor being independently movable and being yieldingly supported by a corresponding number of counter-balanced yoke levers 26 as indicated so that three attendants for each truck, and each having his attention devoted to a nozzle, may operate simultaneously upon the straddled row, and the side rows parallel therewith to insure an expeditious gathering of the cotton, and as above noted, owing to the fact that the suction zone, provided by the large nozzle is extensive, sufficient as indicated to practically inclose a cotton plant, and is proportionately of moderate intensity, only the completely ripe and loose cotton fibers are taken up and conveyed to the receptacle provided for the same.

In other words it is possible with the apparatus described to harvest only the best grade of cotton, and in order that the intensity of the current of air or the tension of the suction may be modified to secure the desired results, a cutter for regulating valves 33 is preferably arranged at the apex of the nozzle and hence within convenient reach of the attendant who may be directing the movement of the nozzle.

Also as a further means as inducing an effective action of the incoming blast of air relied upon to remove the loose cottons from the ripe bolls, perforations 34 may be provided in the wall of the nozzle to the end that gusts of air entering at these openings and progressing transversely with reference to the access of the nozzle will aid in detaching the ripe cotton fibers to permit of their being conveyed by the current of air to the conductor.

Having thus described my invention what I claim as new is:—

A cotton harvesting apparatus having a conductor, a fan for inducing a current of air therethrough, said conductor being provided with a flexible inlet section and an extensible outlet or discharge section, a nozzle connected with the extremity of the flexible section of the conveyer and of a diameter at its inlet end sufficient to extend over and receive a cotton plant, a pivoted lever having a fork engaging the flexible section of the conductor, and a counter-balancing weight connected with the lever for supporting said flexible conductor section and the nozzle.

In testimony whereof I affix my signature.

AUSTIN E. BURGES.